(12) United States Patent
Sakuma et al.

(10) Patent No.: US 10,464,556 B2
(45) Date of Patent: Nov. 5, 2019

(54) VEHICLE MANAGEMENT SYSTEM AND COMMERCIAL FACILITY MANAGEMENT SYSTEM

(71) Applicant: TOYOTA JIDOSHA KABUSHIKI KAISHA, Toyota-shi, Aichi-ken (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/167,454

(22) Filed: Oct. 22, 2018

(65) Prior Publication Data

US 2019/0118802 A1 Apr. 25, 2019

(30) Foreign Application Priority Data

Oct. 25, 2017 (JP) .................................. 2017-206221

(51) Int. Cl.
*G05D 1/02* (2006.01)
*B60W 30/06* (2006.01)
*G08G 1/14* (2006.01)
*G05D 1/00* (2006.01)

(52) U.S. Cl.
CPC ........... *B60W 30/06* (2013.01); *G05D 1/0088* (2013.01); *G08G 1/143* (2013.01); *G08G 1/146* (2013.01); *G05D 2201/0213* (2013.01); *G06Q 2240/00* (2013.01)

(58) Field of Classification Search
CPC ................ G60W 30/06; G05D 1/0088; G05D 2201/0213; G05D 1/0246; G08G 1/143; G08G 1/146; G06Q 2240/00; G01C 21/3438; G01C 21/362
See application file for complete search history.

(56) References Cited

U.S. PATENT DOCUMENTS

| 2015/0073645 | A1* | 3/2015 | Davidsson | B62D 15/0285 701/23 |
| 2015/0346727 | A1* | 12/2015 | Ramanujam | B62D 15/0285 701/23 |
| 2016/0048797 | A1* | 2/2016 | Davidsson | G06Q 10/083 705/332 |
| 2016/0155331 | A1* | 6/2016 | Mielenz | G08G 1/146 340/932.2 |

(Continued)

FOREIGN PATENT DOCUMENTS

JP 2015-176468 A 10/2015

*Primary Examiner* — An T Nguyen
(74) *Attorney, Agent, or Firm* — Hunton Andrews Kurth LLP (57) ABSTRACT

A vehicle management system includes a vehicle controller mountable in a vehicle, and a commercial facility management system for managing a parking lot and payment in a commercial facility. The commercial facility management system includes a system controller. The system controller performs processing for associating the vehicle with a user of the vehicle when the vehicle enters the parking lot, and cooperates with the vehicle controller of the vehicle associated with the user to control the vehicle to travel from a parking place to a pick-up/drop-off place for the user when the user finishes payment.

6 Claims, 4 Drawing Sheets

(56) References Cited

U.S. PATENT DOCUMENTS

| | | | |
|---|---|---|---|
| 2016/0189435 A1* | 6/2016 | Beaurepaire | G05D 1/021 |
| | | | 705/13 |
| 2016/0203650 A1* | 7/2016 | Stanford | G07B 15/02 |
| | | | 705/13 |
| 2016/0210590 A1* | 7/2016 | Sugioka | G06Q 10/08355 |
| 2017/0329346 A1* | 11/2017 | Latotzki | B62D 15/0285 |
| 2018/0089631 A1* | 3/2018 | Baker, Sr. | G06Q 10/1093 |
| 2018/0130161 A1* | 5/2018 | Wengreen | G06Q 20/12 |
| 2018/0202822 A1* | 7/2018 | DeLizio | G01C 21/3438 |

\* cited by examiner

| ENTRY TIME | VEHICLE ID | USER ID | PARKING SPACE NUMBER |
|---|---|---|---|
| a : b | 12345678 | 98765432 | 123 |
| c : d | 23456789 | 87654321 | 234 |
| e : f | 34567890 | 76543210 | 345 |
| ⋮ | ⋮ | ⋮ | ⋮ | ively
VEHICLE MANAGEMENT SYSTEM AND COMMERCIAL FACILITY MANAGEMENT SYSTEM

This nonprovisional application is based on Japanese Patent Application No. 2017-206221 filed on Oct. 25, 2017 with the Japan Patent Office, the entire contents of which are hereby incorporated by reference.

BACKGROUND

Field

The present disclosure relates to a vehicle management system and a commercial facility management system, and in particular to a vehicle management system and a commercial facility management system suitable for a parking lot in a commercial facility.

Description of the Background Art

Conventionally, there has been a system which allows a user to designate a scheduled departure time and thereby enables a vehicle of the user to automatically travel to a getting-in place at the scheduled departure time (Japanese Patent Laying-Open No. 2015-176468).

SUMMARY

However, in the system of Japanese Patent Laying-Open No. 2015-176468, the user designates the scheduled departure time with time to spare, because the user does not know exactly when the user will finish payment for shopping. Accordingly, it is highly likely that there occurs a waiting time from when the user finishes payment for shopping until when the user gets in the vehicle.

The present disclosure has been made to solve such a problem, and an object thereof is to provide a vehicle management system and a commercial facility management system capable of reducing a waiting time from when a user finishes payment until when the user gets in a vehicle.

A vehicle management system for managing a vehicle in accordance with the present disclosure includes a vehicle controller mountable in the vehicle, and a commercial facility management system for managing a parking lot and payment in a commercial facility. The commercial facility management system includes a system controller. The system controller is configured to perform processing for associating the vehicle with a user of the vehicle when the vehicle enters the parking lot, and cooperate with the vehicle controller of the vehicle associated with the user to control the vehicle to travel from a parking place to a pick-up/drop-off place for the user when the user finishes payment.

With such a configuration, the vehicle of the user travels to the pick-up/drop-off place when the user finishes payment. As a result, a vehicle management system capable of reducing a waiting time from when a user finishes payment until when the user gets in a vehicle can be provided.

Preferably, the system controller is configured to cooperate with the vehicle controller of the vehicle to control the vehicle to travel from the pick-up/drop-off place to the parking place when the vehicle enters the parking lot. With such a configuration, the user does not have to drive the vehicle also when parking the vehicle.

Preferably, the commercial facility management system further includes a storage. The system controller is configured to perform storage processing for storing identification information of the vehicle and identification information of the user in association with each other in the storage, as the processing for associating the vehicle with the user of the vehicle. Such a configuration can reliably associate the identification information of the user with the identification information of the vehicle of the user.

Further preferably, the system controller is configured to obtain the identification information of the user stored beforehand in a recording medium of the user, and obtain the identification information of the vehicle stored beforehand in a storage of the vehicle, to perform the storage processing. With such a configuration, the identification information of the user and the identification information of the vehicle of the user can be accurately obtained.

Further preferably, the system controller is configured to obtain the identification information of the vehicle of the user stored beforehand in the recording medium of the user, and perform the storage processing when the identification information obtained from the recording medium matches the identification information obtained from the vehicle. Such a configuration can prevent a vehicle which is not the vehicle of the user from being associated with the user.

Preferably, when the user stands in a waiting line for payment, the system controller is configured to obtain identification information of the user stored beforehand in a recording medium of the user, estimate a time at which the user will finish payment, and control the vehicle to arrive at the pick-up/drop-off place at the estimated time. With such a configuration, the vehicle of the user can arrive at the pick-up/drop-off place when the user finishes payment. As a result, the waiting time from when the user finishes payment until when the user gets in the vehicle can be further reduced.

A commercial facility management system in accordance with another aspect of the present disclosure manages a parking lot and payment in a commercial facility. The commercial facility management system includes a controller. The controller is configured to perform processing for associating a vehicle with a user of the vehicle when the vehicle enters the parking lot, and cooperate with the vehicle associated with the user to control the vehicle to travel from a parking place to a pick-up/drop-off place for the user when the user finishes payment.

With such a configuration, a commercial facility management system capable of reducing a waiting time from when a user finishes payment until when the user gets in a vehicle can be provided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure will be described in detail with reference to the drawings. It should be noted that identical or corresponding parts in the drawings will be designated by the same reference numerals, and the description thereof will not be repeated.

Figure 1:
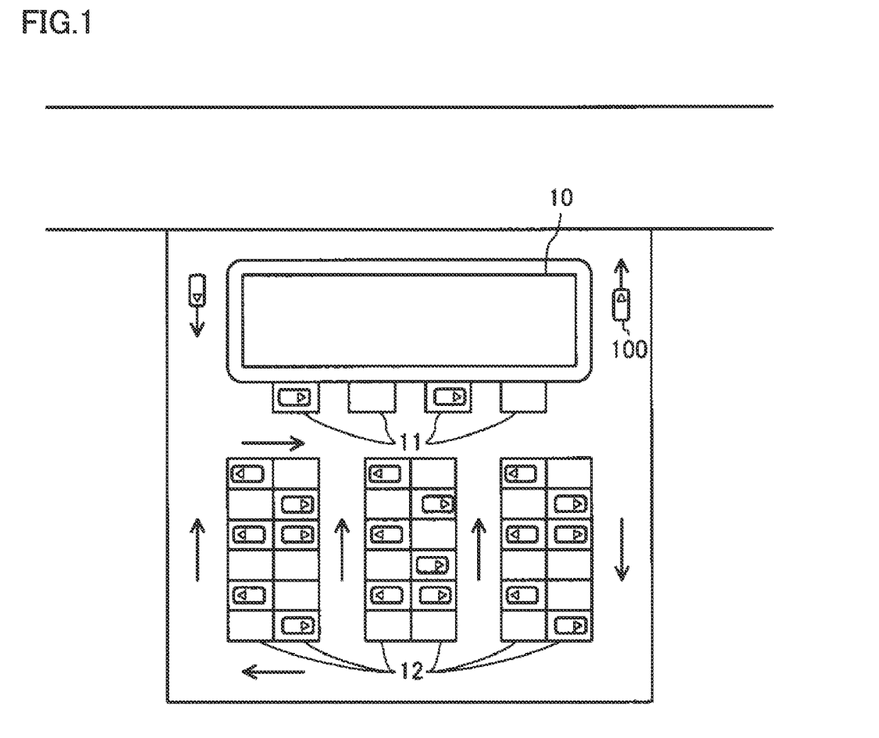
FIG. 1 is a view showing an exemplary layout of a commercial facility where a vehicle management system in accordance with the present embodiment is used.

FIG. 1 is a view showing an exemplary layout of a commercial facility where a vehicle management system 1 in accordance with the present embodiment is used. Referring to FIG. 1, within the area of the commercial facility serving as an example are arranged a store 10, a parking lot provided with a plurality of parking spaces 12, and pick-up/drop-off places 11 for vehicles 100 adjacent to store 10. The inside of the parking lot is designed such that vehicle 100 going toward a parking space 12 and vehicle 100 exiting a parking space 12 can travel in one-way traffic. While vehicle 100 may have any type of motive power source such as an internal combustion engine or a motor generator, it is assumed in the present embodiment that vehicle 100 is an electric vehicle.

Figure 2:
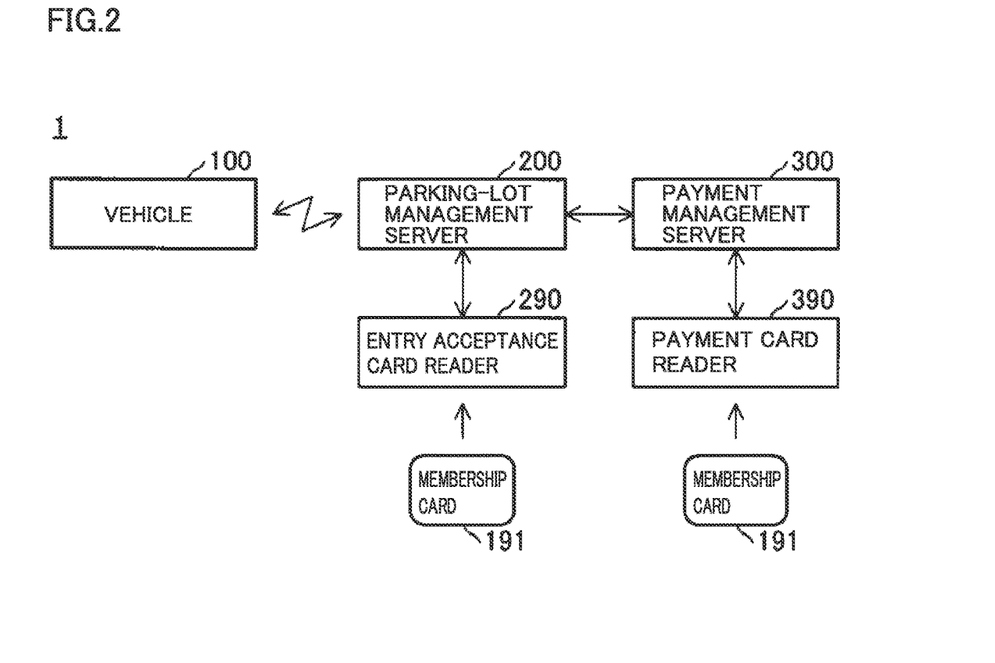
FIG. 2 is a view schematically showing an entire configuration of the vehicle management system in accordance with the present embodiment.

FIG. 2 is a view schematically showing an entire configuration of vehicle management system 1 in accordance with the present embodiment. Referring to FIG. 2, vehicle management system 1 includes a plurality of vehicles 100, a parking-lot management server 200 which manages the parking lot in the commercial facility, and a payment management server 300 which manages payment in the commercial facility. Parking-lot management server 200 and payment management server 300 are connected through a LAN (Local Area Network). Vehicle 100 and parking-lot management server 200 are configured to establish direct wireless communication therebetween, and are connected through a wireless LAN, for example. It should be noted that vehicle 100 and parking-lot management server 200 may be configured to communicate with each other via a server which manages communication of the plurality of vehicles 100. Further, when vehicle 100 and parking-lot management server 200 communicate with each other, it is preferable for each of them to check whether its communication partner is authorized.

At least one entry acceptance card reader 290 which accepts a user's membership card 191 when the user enters the parking lot is connected to parking-lot management server 200. Entry acceptance card reader 290 is placed near pick-up/drop-off place 11. At least one payment card reader 390 which accepts the user's membership card 191 when the user makes payment is connected to payment management server 300. Payment card reader 390 is placed at an entrance of a waiting line in a payment place within store 10.

It should be noted that membership card 191 may be a magnetic card, a card having a bar code, a two-dimensional code, or the like printed thereon, or a contact or non-contact IC (Integrated Circuit) card. Further, instead of membership card 191, a mobile terminal such as a smart phone which can be used as membership card 191 by installing an application program (hereinafter also referred to as an "application") for members of the commercial facility may be used. In the case of using a mobile terminal, non-contact communication such as NFC (Near field radio communication) which can be established by activating the application may be used, or a two-dimensional code may be displayed in a display device. Entry acceptance card reader 290 and payment card reader 390 only need to support the formats of membership card 191 and the mobile terminal used instead of membership card 191.

Figure 3:
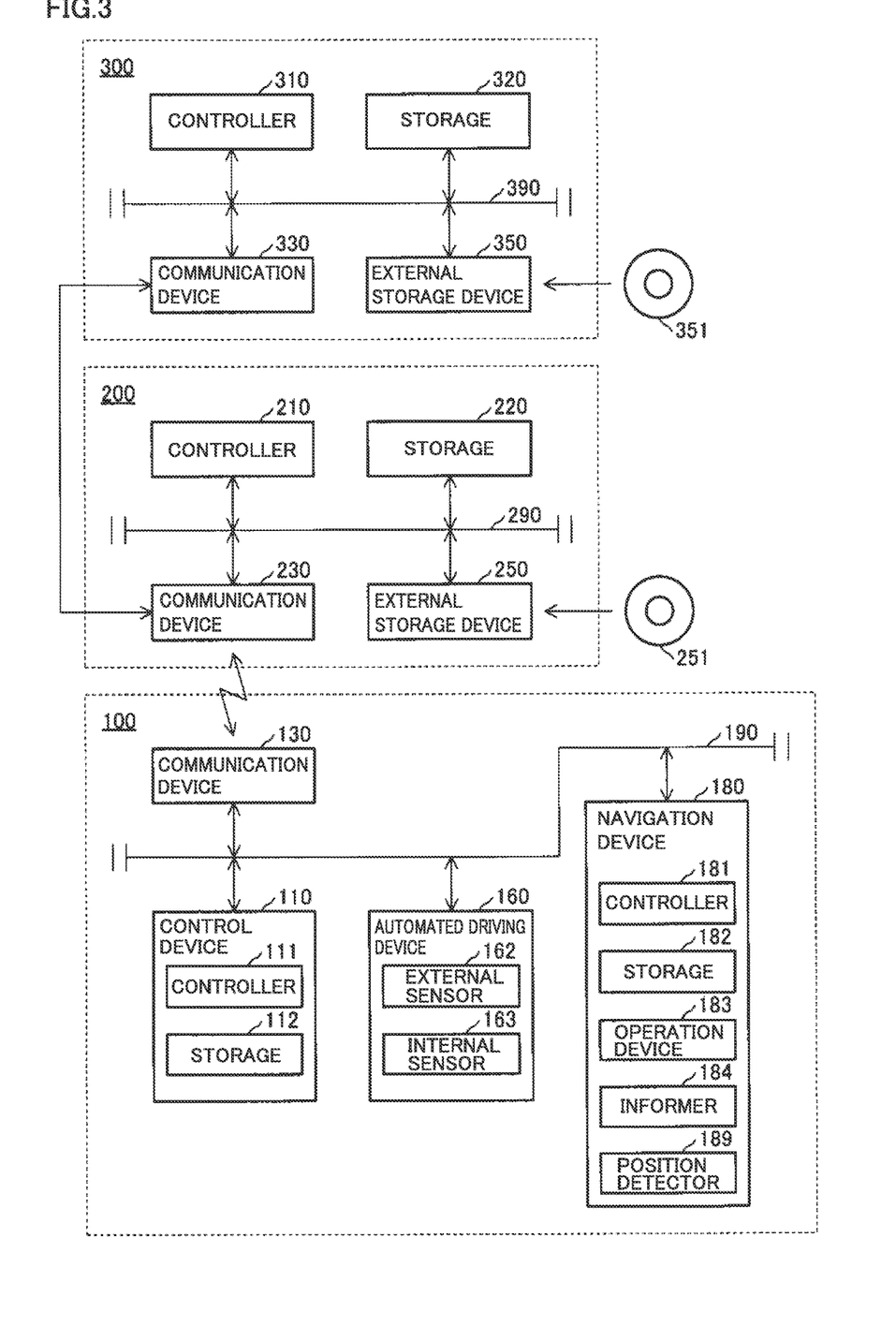
FIG. 3 is a block diagram for illustrating a configuration of a vehicle, a parking-lot management server, and a payment management server included in the vehicle management system in accordance with the present embodiment.

FIG. 3 is a block diagram for illustrating a configuration of vehicle 100, parking-lot management server 200, and payment management server 300 included in vehicle management system 1 in accordance with the present embodiment. Referring to FIG. 3, vehicle 100 includes a control device 110, a communication device 130, an automated driving device 160, and a navigation device 180. Control device 110, communication device 130, automated driving device 160, and navigation device 180 are connected with each other through a wired, vehicle-mounted network 190 such as a CAN (Controller Area Network).

Communication device 130 transmits and receives data to and from an external device (for example, parking-lot management server 200), using a predetermined protocol. Communication device 130 transmits data received from a device connected to vehicle-mounted network 190, such as control device 110, to the outside, or passes data received from the outside to a device connected to vehicle-mounted network 190, such as control device 110.

Navigation device 180 includes a controller 181 for controlling entire navigation device 180, a storage 182 for storing predetermined information, an operation device 183 for operating navigation device 180, an informer 184 for informing predetermined information of navigation device 180 through display and voice, and a position detector 189 for detecting a position.

Storage 182 includes a RAM (Random Access Memory) used as a workspace necessary to execute a program by controller 181, and a ROM (Read Only Memory) for storing the program to be executed by controller 181. In addition, in the RAM, programs and data for executing predetermined processing are read from the ROM or the like and are stored. Further, a recording medium such as a memory card may be used as an auxiliary storage device for assisting a storage area of the RAM.

Operation device 183 includes a plurality of operation buttons for causing navigation device 180 to perform a predetermined function, and a touch panel formed on a display of informer 184. An operation signal indicating operation contents input into navigation device 180 by operating the operation buttons and the touch panel of operation device 183 is passed to controller 181.

Informer 184 includes a liquid crystal display device (hereinafter referred to as an "LCD") having the display, on which the touch panel is formed, and a speaker. The LCD of informer 184 displays an image received from controller 181 indicating information for navigating vehicle 100 and the operation buttons of the touch panel, and the like. It should be noted that informer 184 may include another FPD (Flat Panel Display) such as an EL (Electro-Luminescence) display, instead of an LCD. The speaker of informer 184 outputs a voice signal received from controller 181 as voice.

Position detector 189 detects the position of the vehicle based on an electric wave from a GPS (Global Positioning System) satellite, and passes the detected position information to controller 181.

Controller 181 includes an MPU (Micro Processing Unit) and an auxiliary circuit thereof. Controller 181 controls storage 182, operation device 183, informer 184, and position detector 189, performs predetermined processing according to the programs and data stored in storage 182, processes data input from operation device 183 or other devices connected to vehicle-mounted network 190 (for example, automated driving device 160, control device 110, communication device 130, and the like), and causes the processed data to be stored in storage 182, to be informed by informer 184, or to be output to the other devices.

Specifically, controller 181 performs a variety of navigation processing for vehicle 100 using the position information (GPS information) of vehicle 100 detected by position detector 189. More specifically, controller 181 controls informer 184 to calculate a traveling route (a scheduled traveling route or a target route) for vehicle 100 from the present location to a destination based on the GPS information of vehicle 100 and road map data stored in storage 182, display information on the target route, and output the information as voice.

Automated driving device 160 is configured to perform automated driving of vehicle 100. The term "automated driving" refers to control by which driving operations of vehicle 100 such as acceleration, deceleration, and steering are performed without driving operations by a driver of vehicle 100. Automated driving includes lane keeping support control and navigation control, for example. In the lane keeping support control, a steering wheel (not shown) is automatically steered to allow vehicle 100 to travel along a driving lane without deviating from the driving lane. In the navigation control, for example, when there is no leading vehicle ahead of vehicle 100, constant speed control which allows vehicle 100 to travel at a preset constant speed is performed, whereas when there is a leading vehicle ahead of vehicle 100, following control which adjusts the vehicle speed of vehicle 100 depending on the distance to the leading vehicle is performed.

More specifically, automated driving device 160 is configured to perform unattended driving (fully automated driving) defined as so-called "Level 5". That is, in the automated driving by automated driving device 160, the driver does not need to get in and operate the vehicle under all the situations. Accordingly, vehicle 100 can be automatically forwarded. Automated driving device 160 includes an external sensor 162 configured to detect a situation outside vehicle 100, and an internal sensor 163 configured to detect information corresponding to a traveling state of vehicle 100 and detect a steering operation, an accelerating operation, and a braking operation.

External sensor 162 includes a camera, a radar, and a LIDAR (Laser Imaging Detection and Ranging) (all not shown), for example. The camera shoots an image of the situation outside vehicle 100, and outputs shot-image information regarding the situation outside vehicle 100 to control device 110. The radar transmits an electric wave (for example, a millimeter wave) to surroundings of vehicle 100, and receives an electric wave reflected by an obstacle to detect the obstacle. The radar outputs, for example, a distance to the obstacle and a direction of the obstacle, as obstacle information regarding the obstacle, to control device 110. The LIDAR transmits light (typically, ultraviolet rays, visible rays, or near infrared rays) to surroundings of vehicle 100 and receives light reflected by an obstacle to measure a distance to a reflecting point and detect the obstacle. The LIDAR outputs, for example, a distance to the obstacle and a direction of the obstacle, as obstacle information, to control device 110.

Internal sensor 163 includes a vehicle speed sensor, an acceleration sensor, and a yaw rate sensor (all not shown), for example. The vehicle speed sensor is provided at a wheel of vehicle 100, a drive shaft or a transmission rotated together with the wheel, or the like, detects a rotating speed of the wheel, and outputs vehicle speed information including the speed of vehicle 100 to control device 110. The acceleration sensor includes a forward/backward acceleration sensor configured to detect acceleration in a forward/backward direction of vehicle 100, and a lateral acceleration sensor configured to detect lateral acceleration of vehicle 100, for example. The acceleration sensor outputs acceleration information including both the accelerations to control device 110. The yaw rate sensor detects a yaw rate (rotation angle speed) around the vertical axis of the center of gravity of vehicle 100. The yaw rate sensor is, for example, a gyro sensor, and outputs yaw rate information including the yaw rate of vehicle 100 to control device 110.

Control device 110 is a so-called ECU (Electronic Control Unit), and includes a controller 111 for controlling entire vehicle 100, and a storage 112 for storing predetermined information. Storage 112 is the same as storage 182 of navigation device 180 described above, and thus an overlapped description thereof will not be repeated.

Controller 111 includes an MPU (Micro Processing Unit) and an auxiliary circuit thereof. Controller 111 performs predetermined processing according to programs and data stored in storage 112, processes data input from other devices connected to vehicle-mounted network 190 (for example, communication device 130, automated driving device 160, navigation device 180, and the like), and causes the processed data to be stored in storage 112, or to be output to the other devices.

Specifically, controller 111 controls devices such as a drive device for a motor generator in response to signals from sensors such as external sensor 162 and internal sensor 163 of vehicle 100, such that vehicle 100 enters a desired state.

Parking-lot management server 200 includes a controller 210, a storage 220, a communication device 230, and an external storage device 250. Storage 220 and communication device 230 are the same as storage 112 of control device 110 and communication device 130 of vehicle 100 described above, and thus an overlapped description thereof will not be repeated.

External storage device 250 includes a storage device such as a hard disk drive, a flexible disk drive, an MO (Magneto-Optical disk) drive, a CD (Compact Disc) drive, a DVD (Digital Versatile Disk) drive, or a memory card reader writer. External storage device 250 magnetically, optically, or electrically records predetermined data or program received from controller 210 in a recording medium 251, or reads the data or program from recording medium 251 and passes it to controller 210. Examples of recording medium 251 include magnetic disks such as a hard disk and a flexible disk, optical disks such as a CD-ROM (Compact Disk Read Only Memory), a CD-R (Compact Disk Recordable), a CD-RW (Compact Disk ReWritable), a DVD-ROM (Digital Versatile Disk Read Only Memory), a DVD-R (Digital Versatile Disk Recordable), a DVD-RW (Digital Versatile Disk ReWritable), a DVD-RAM (Digital Versatile Disk Random Access Memory), a DVD+R, and a DVD+RW, magneto-optical disks such as an MO (Magneto-Optical disk), a memory card, and a USB (Universal Serial Bus) memory.

Controller 210 includes an MPU (Micro Processing Unit) and an auxiliary circuit thereof. Controller 210 controls storage 220, communication device 230, and external storage device 250, performs predetermined processing according to programs and data stored in storage 220, processes data input from communication device 230 and external storage device 250, and causes the processed data to be stored in storage 220, to be output from communication device 230 to other devices, or to be stored in recording medium 251 of external storage device 250.

It should be noted that, although parking-lot management server 200 does not include an operation device and a display device in the present embodiment, the present disclosure is not limited thereto, and parking-lot management server 200 may include components of an operation device and a display device. The operation device includes a keyboard and a mouse, and an operation signal indicating operation contents input into parking-lot management server 200 by operating the keyboard and the mouse of the operation device is passed to controller 210. The display device includes an LCD, and the LCD displays an image corresponding to image data received from controller 210.

Payment management server 300 includes a controller 310, a storage 320, a communication device 330, and an external storage device 350. Controller 310, storage 320, communication device 330, and external storage device 350 are the same as controller 210, storage 220, communication device 230, and external storage device 250, respectively, of parking-lot management server 200 described above, and thus an overlapped description thereof will not be repeated.

According to a conventional system, there has been a system which allows a user to designate a scheduled departure time and thereby enables a vehicle of the user to automatically travel to a getting-in place at the scheduled departure time. However, in such a system, the user designates the scheduled departure time with time to spare, because the user does not know exactly when the user will finish payment for shopping. Accordingly, it is highly likely that there occurs a waiting time from when the user finishes payment for shopping until when the user gets in the vehicle.

Thus, in the present embodiment, vehicle management system 1 is configured to perform processing for associating vehicle 100 with a user of vehicle 100 when vehicle 100 enters the parking lot, and cooperate with control device 110 of vehicle 100 associated with the user to control vehicle 100 to travel from a parking place to a pick-up/drop-off place for the user when the user finishes payment.

Thereby, vehicle 100 of the user travels to the pick-up/drop-off place when the user finishes payment. As a result, the waiting time from when the user finishes payment until when the user gets in vehicle 100 can be reduced.

Figure 4:
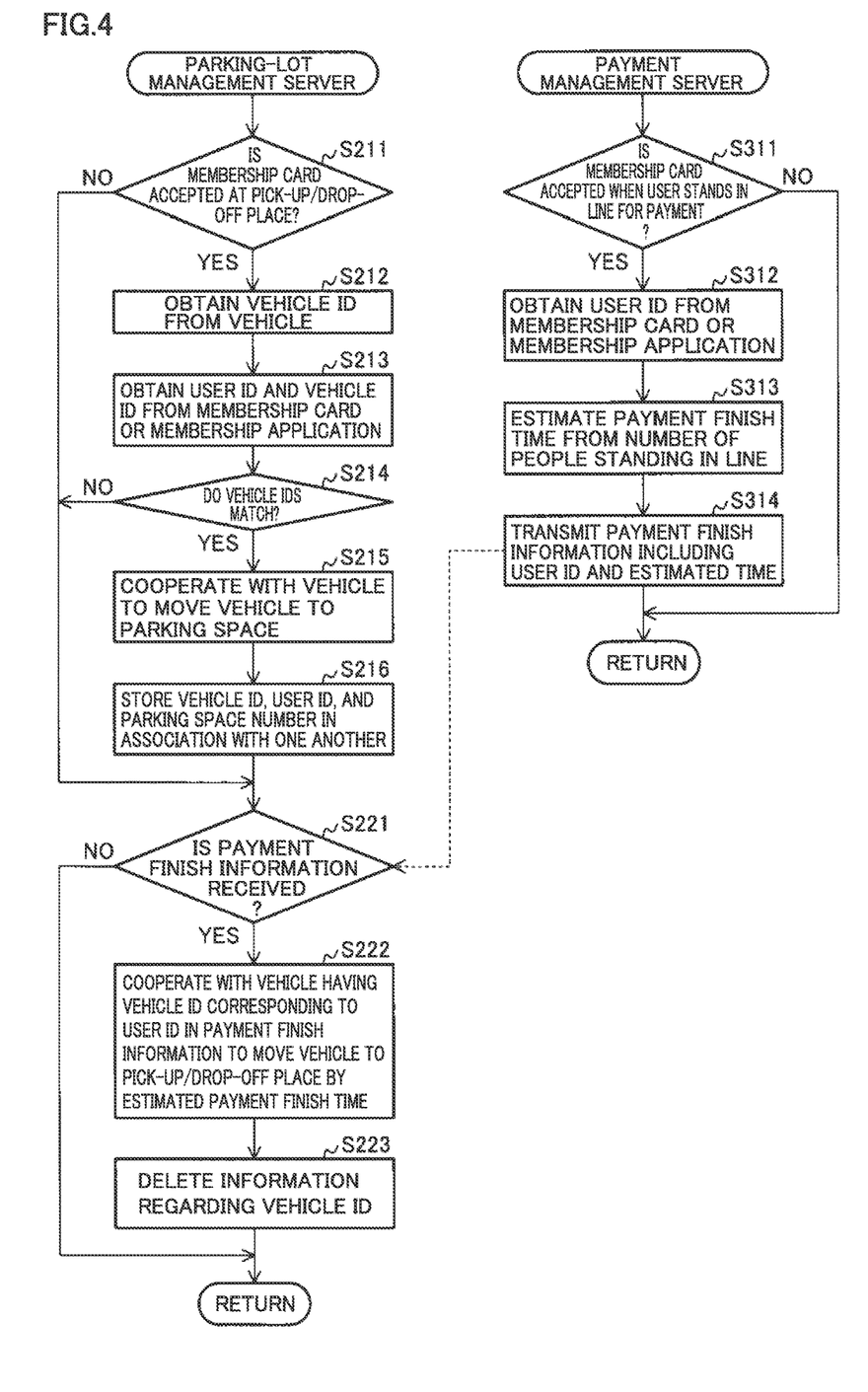
FIG. 4 is a flowchart showing a flow of processing performed by the parking-lot management server and the payment management server of the present embodiment.

FIG. 4 is a flowchart showing a flow of processing performed by parking-lot management server 200 and payment management server 300 of the present embodiment. Referring to FIG. 4, first, arrival acceptance processing performed when a user arrives at a commercial facility by driving vehicle 100 will be described.

Controller 210 of parking-lot management server 200 determines whether or not the user's membership card 191 or mobile terminal having the membership application installed therein is accepted by entry acceptance card reader 290 at pick-up/drop-off place 11 (S211). In membership card 191 or the mobile terminal having the membership application installed therein, a user ID for uniquely identifying the user as a member, and a vehicle ID for uniquely identifying vehicle 100 of the user are stored beforehand. When controller 210 determines that membership card 191 or the mobile terminal having the membership application installed therein is not accepted (NO in S211), controller 210 proceeds the processing to be performed to S221.

On the other hand, when controller 210 determines that membership card 191 or the mobile terminal having the membership application installed therein is accepted (YES in S211), controller 210 obtains the vehicle ID of vehicle 100 from vehicle 100 (S212). The vehicle ID is stored beforehand in storage 112 of control device 110 of vehicle 100. It should be noted that, when vehicle IDs are obtained from the plurality of vehicles 100, processing for checking which of vehicles 100 the user drives is performed. For example, entry acceptance card reader 290 is provided with a display device having a touch panel, to display information for specifying the plurality of vehicles 100 whose vehicle IDs are obtained, in the display device. The user touches information of his or her vehicle 100 displayed in the display device, to check vehicle 100 the user drives.

Next, controller 210 obtains the user ID and the vehicle ID from the accepted membership card 191 or mobile terminal having the membership application installed therein (S213). Then, controller 210 determines whether or not the vehicle ID obtained in S212 matches the vehicle ID obtained in S213 (S214). When controller 210 determines that the vehicle IDs do not match (NO in S214), controller 210 suspends the arrival acceptance processing, and proceeds the processing to be performed to S221. It should be noted that, on this occasion, the user may be informed, through display or voice, that the vehicle ID obtained from the vehicle does not match the vehicle ID obtained from the membership card or the mobile terminal, and/or that the user should perform the arrival acceptance processing again from the beginning.

When controller 210 determines that the vehicle IDs match (YES in S214), controller 210 cooperates with vehicle 100 to control vehicle 100 to move to a vacant parking space 12 (S215). For example, controller 210 specifies vacant parking space 12 with a camera provided to the parking lot or the like, and transmits information including a map of the parking lot and position information such as the number, longitude/latitude, or the like of vacant parking space 12, to vehicle 100. Control device 110 of vehicle 100 cooperates with navigation device 180 to calculate a route to parking space 12 from the received map of the parking lot and position information of parking space 12, and cooperates with automated driving device 160 to cause vehicle 100 to automatically travel along the calculated route and to be parked at parking space 12. It should be noted that the map of the parking lot may be stored beforehand in storage 182 of navigation device 180.

Then, controller 210 checks that vehicle 100 is parked at parking space 12, and thereafter stores the vehicle ID, the user ID, and the number of parking space 12 in association with one another in storage 220 (S216).

Figure 5:
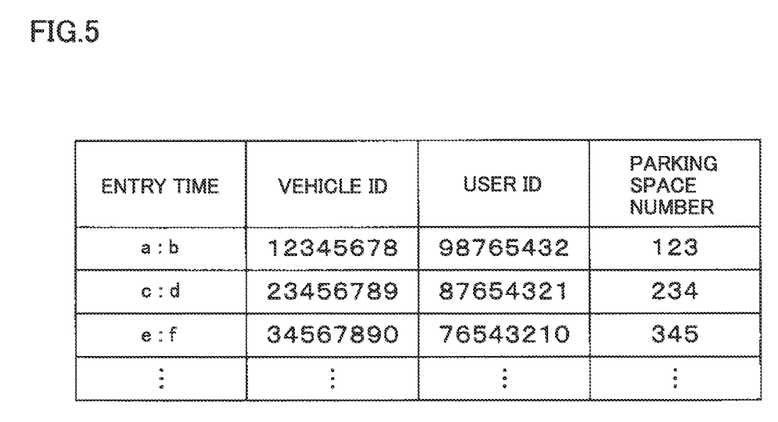
FIG. 5 is a view for illustrating user vehicle information stored in the parking-lot management server of the present embodiment.

FIG. 5 is a view for illustrating user vehicle information stored in parking-lot management server 200 of the present embodiment. Referring to FIG. 5, in S216 of FIG. 4, the vehicle ID, the user ID, and the number of parking space 12 are stored in association with one another in storage 220. It should be noted that, on this occasion, entry time is also stored in association therewith.

Turning back to FIG. 4, next, payment acceptance processing performed when the user makes payment at store 10 in the commercial facility will be described. Controller 310 of payment management server 300 determines whether or not the user's membership card 191 or mobile terminal having the membership application installed therein is accepted by payment card reader 390 placed at an entrance of a waiting line when the user stands in the waiting line for payment (S311). When controller 310 determines that membership card 191 or the mobile terminal having the membership application installed therein is not accepted (NO in S311), controller 310 returns the processing to be performed to a caller of this processing.

On the other hand, when controller 310 determines that membership card 191 or the mobile terminal having the membership application installed therein is accepted (YES in S311), controller 310 obtains the user ID from the accepted membership card 191 or mobile terminal having the membership application installed therein (S312).

Next, controller 310 estimates a payment finish time for the user, from the number of people standing in the waiting line for payment (S313). For example, when an average time required by one person for payment is k minutes and n persons are standing in the waiting line, controller 310 estimates that the payment finish time will be k×n (minutes). The average time required by one person for payment can be modified to further adapt to the situation of store 10 by updating data for every payment in store 10. In addition, the number of people standing in the waiting line can be specified, for example, by issuing a ticket having a number printed thereon at the entrance of the waiting line, and subtracting the number of the ticket issued for the person currently making payment from the number of the ticket issued for the last person in the line.

Then, controller 310 transmits payment finish information including the user ID obtained in S312 and the payment finish time estimated in S313 to parking-lot management server 200 (S314).

Controller 210 of parking-lot management server 200 determines whether or not the payment finish information is received from payment management server 300 (S221). When controller 210 determines that the payment finish information is not received (NO in S221), controller 210 returns the processing to be performed to a caller of this processing.

When controller 210 determines that the payment finish information is received (YES in S221), controller 210 reads the vehicle ID corresponding to the user ID included in the received payment finish information from the user vehicle information stored in storage 220 shown in FIG. 5, and cooperates with vehicle 100 having the vehicle ID to control vehicle 100 to move from parking space 12 at which vehicle 100 is parked to pick-up/drop-off place 11, by the payment finish time included in the received payment finish information (S222).

Then, when vehicle 100 moves to pick-up/drop-off place 11, controller 210 deletes the user vehicle information regarding the vehicle ID from storage 220 (S223), and returns the processing to be performed to the caller of this processing.

[Variations]

(1) In the embodiment described above, the vehicle ID is different from the user ID, as shown in FIG. 5 and the like. The vehicle ID may be identical to the user ID. In this case, in S216 of FIG. 4, one ID is stored, instead of storing the vehicle ID and the user ID in association with each other.

(2) In the embodiment described above, the vehicle ID and the user ID are stored in association with each other in storage 220 of parking-lot management server 200, as indicated in S216 of FIG. 4. However, the present disclosure is not limited thereto, and the vehicle ID and the user ID may be stored in storage 320 of payment management server 300.

(3) In the embodiment described above, parking-lot management server 200 and payment management server 300 are configured with separate computers, as shown in FIGS. 2 and 3. However, the present disclosure is not limited thereto, and parking-lot management server 200 and payment management server 300 may be configured with one computer.

(4) In the embodiment described above, for automatic traveling control, unattended driving defined as "Level 5" is performed by automated driving device 160 of the vehicle, as shown in FIG. 3. However, the present disclosure is not limited thereto, and the vehicle may travel by remote control from parking-lot management server 200. For example, the entire parking lot may be shot from above, and vehicle 100 may be caused to travel from pick-up/drop-off place 11 to parking space 12 by remote control based on a shot image. In addition, a guidance track provided on the ground surface of the parking lot may be configured to be read by vehicle 100, and vehicle 100 may be allowed to travel along the guidance track to parking space 12.

(5) In the embodiment described above, the processing shown in FIG. 4 is implemented when software is executed by controllers 210, 310. However, the present disclosure is not limited thereto, and the processing shown in FIG. 4 may be partly or entirely implemented by a dedicated hardware circuit.

(6) In the embodiment described above, the disclosure has been described as vehicle management system 1. However, the present disclosure is not limited thereto, and the disclosure can be considered as a vehicle management method performed by vehicle management system 1. The disclosure can also be considered as a device such as a server such as parking-lot management server 200 or payment management server 300 included in vehicle management system 1. Further, the disclosure can be considered as a method or a program performing the processing shown in FIG. 4 in a server such as parking-lot management server 200 or payment management server 300.

In addition, the disclosure can be considered as computer-readable recording medium 251, 351 which records the program. This recording medium 251, 351 may be a medium which stationarily carries a program, including a magnetic tape, a magnetic disk such as a flexible disk or a hard disk, an optical disk such as a CD-ROM, a CD-R, a CD-RW, a DVD-ROM, a DVD-R, a DVD-RW, a DVD-RAM, a DVD+R, or a DVD+RW, a magneto-optical disk such as an MO, a memory card, a USB memory, or the like, or may be a medium which fluidly carries a program such that the program is downloaded from a server such as an ASP (Application Service Provider) via a communication network.

(7) The techniques described in the embodiment and the variations are intended to be performed alone or in combination, as far as possible.

[Effects Obtained by Present Disclosure]

(1) As shown in FIGS. 2 and 3, vehicle management system 1 in accordance with the present disclosure includes vehicle 100, and a commercial facility management system including parking-lot management server 200 and payment management server 300 for respectively managing a parking lot and payment in a commercial facility. As shown in FIG. 3, the commercial facility management system includes controllers 210, 310. Vehicle 100 includes control device 110. As indicated in S211 to S216 of FIG. 4, controller 210 performs processing for associating vehicle 100 with a user of vehicle 100 when vehicle 100 enters the parking lot. As indicated in S311 to S314 and S221 to S222 of FIG. 4, controllers 210, 310 cooperate with control device 110 of vehicle 100 associated with the user to control vehicle 100 to travel from parking space 12 to pick-up/drop-off place 11 for the user when the user finishes payment.

Thereby, vehicle 100 of the user travels to pick-up/drop-off place 11 when the user finishes payment. As a result, the waiting time from when the user finishes payment until when the user gets in vehicle 100 can be reduced.

(2) As indicated in S215 of FIG. 4, controller 210 cooperates with control device 110 of vehicle 100 to control vehicle 100 to travel from pick-up/drop-off place 11 to parking space 12 when vehicle 100 enters the parking lot. Thereby, the user does not have to drive vehicle 100 also when parking vehicle 100.

(3) As shown in FIG. 3, parking-lot management server 200 of the commercial facility management system further includes storage 220. As indicated in S216 of FIG. 4, controller 210 performs storage processing for storing a vehicle ID of the vehicle and a user ID of the user in association with each other in storage 220, as the processing for associating vehicle 100 with the user of vehicle 100. This can reliably associate the user ID with the vehicle ID of the user.

(4) As indicated in S213 and S216 of FIG. 4, controller 210 obtains the user ID of the user stored beforehand in the user's membership card 191 or mobile terminal having the membership application installed therein, and obtains the vehicle ID of vehicle 100 stored beforehand in storage 112 of control device 110 of vehicle 100, to perform the storage processing. Thereby, the user ID and the vehicle ID of the user can be accurately obtained.

(5) As indicated in S214 and S216 of FIG. 4, controller 210 obtains the vehicle ID of vehicle 100 of the user stored beforehand in the user's membership card 191 or mobile terminal having the membership application installed therein, and performs the storage processing when the vehicle ID obtained from membership card 191 or the mobile terminal matches the vehicle ID obtained from vehicle 100. This can prevent a vehicle which is not vehicle 100 of the user from being associated with the user.

(6) As indicated in S311 to S314 and S221 to S222 of FIG. 4, when the user stands in a waiting line for payment, controllers 310, 210 obtain the user ID of the user stored beforehand in the user's membership card 191 or mobile terminal having the membership application installed therein, estimate a time at which the user will finish payment, and control vehicle 100 to arrive at pick-up/drop-off place 11 at the estimated time. Thereby, vehicle 100 of the user can arrive at pick-up/drop-off place 11 when the user finishes payment. As a result, the waiting time from when the user finishes payment until when the user gets in vehicle 100 can be further reduced.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A vehicle management system for managing a vehicle comprising:
   a vehicle controller mountable in the vehicle; and
   a commercial facility management system for managing a parking lot and payment in a commercial facility, the commercial facility management system including a system controller, the system controller being configured to perform processing for associating the vehicle with a user of the vehicle when the vehicle enters the parking lot, and cooperate with the vehicle controller of the vehicle associated with the user to control the vehicle to travel from a parking place to a pick-up/drop-off place for the user when the user finishes payment;
   wherein, when the user stands in a waiting line for payment, the system controller is configured to obtain identification information of the user stored beforehand in a recording medium of the user, estimate a time at which the user will finish payment, and control the vehicle to arrive at the pick-up/drop-off place at the estimated time.

2. The vehicle management system according to claim 1, wherein the system controller is configured to cooperate with the vehicle controller of the vehicle to control the vehicle to travel from the pick-up/drop-off place to the parking place when the vehicle enters the parking lot.

3. The vehicle management system according to claim 1, wherein the commercial facility management system further includes a storage, and the system controller is configured to perform storage processing for storing identification information of the vehicle and identification information of the user in association with each other in the storage, as the processing for associating the vehicle with the user of the vehicle.

4. The vehicle management system according to claim 3, wherein the system controller is configured to obtain the identification information of the user stored beforehand in a recording medium of the user, and obtain the identification information of the vehicle stored beforehand in a storage of the vehicle, to perform the storage processing.

5. The vehicle management system according to claim 4, wherein the system controller is configured to obtain the identification information of the vehicle of the user stored beforehand in the recording medium of the user, and perform the storage processing when the identification information obtained from the recording medium matches the identification information obtained from the vehicle.

6. A commercial facility management system for managing a parking lot and payment in a commercial facility, the commercial facility management system comprising
   a controller, the controller being configured to perform processing for associating a vehicle with a user of the vehicle when the vehicle enters the parking lot, and cooperate with the vehicle associated with the user to control the vehicle to travel from a parking place to a pick-up/drop-off place for the user when the user finishes payment;
   wherein, when the user stands in a waiting line for payment, the controller is configured to obtain identification information of the user stored beforehand in a recording medium of the user, estimate a time at which the user will finish payment, and control the vehicle to arrive at the pick-up/drop-off place at the estimated time.

* * * * *